Patented Jan. 13, 1953

2,625,471

UNITED STATES PATENT OFFICE 2,625,471

FERTILIZING COMPOSITIONS

David T. Mowry and Ross M. Hedrick, Dayton, Ohio, assignors to Monsanto Chemical Company, St. Louis, Mo., a corporation of Delaware No Drawing. Application February 20, 1952, Serial No. 272,698

13 Claims. (Cl. 71—1)

The present invention relates to methods of conditioning the physical structure of soils and enhancing their capacity for supporting vigorous plant growth. More specifically the invention relates to fertilizing compositions which simultaneously condition the soils and thereby permit substantial increase in crop yields.

The ultimate utility and the beneficial properties of top soils and soils of sub-surface strata depend substantially upon the physical structure of that soil. Although most soils have a fine state of sub-division necessary for the growth of plants, many do not have other physical properties which enable the proper growth and development of the plant structures and the proper performance of the various plant functions. In addition to the plant nutrients a soil must have a continuous supply of both air and moisture. Soils of poor structure may become water-logged during wet seasons, which state excludes the air necessary for optimum growth and development of the plant. Soils of poor structure may lose moisture too rapidly by evaporation from the surface due to excessive capillary action, and plants growing therein will be deprived of the required continuous and abundant supply of moisture. The latter effect becomes excessive in closely compacted soils where also the growth of roots and stems are retarded due to unfavorable growing conditions. Soils of poor structure are subject to shrinkage which induces undesirable compaction, especially in the form of a surface crust, and produces cracks or fissures which increase the rate of transfer of soil moisture to the atmosphere. Furthermore, soils of poor structure frequently experience poor germination of seeds planted therein due to the lack of either air or moisture required for normal germination.

It is also well-known that soils of poor structure are subject to erosion, because when subjected to rainfall they soon become puddled and the excess moisture flows across the surface of the soil or in a confined channel. This surface water washes away the fine soil particles and results in the displacement of large quantities of valuable soils. Much of the damage to soils of poor structure is directly attributable to raindrop impact which breaks down the existing aggregates into smaller and more readily removable fragments. The quantity of surface water is increased both by the failure of the soil to absorb surface water and by the failure of the soil to provide a medium for transferring the water to underlying bodies of soil or to natural water courses.

The problem of increasing the tilth of soils and the problem of preventing erosion may both be solved or greatly diminished by providing a means of improving the physical structure of the soil. When soil is plowed and raked it is possible to provide a loose structure which retains moisture better and contains sufficient air for the propagation of plants. The improvement of soil structure by the tillage is not long lasting and the action of rain and sun will soon cause the soil to slake down to form a dense compact structure with a hard impervious crust, thereby losing its desirable properties. If soil is cultivated over a number of years and especially if organic fertilizers are added thereto, the soil may gradually attain good structure of more permanent nature. This improvement in the structure is believed to be due to various humus materials, including polysaccharides, generated by the soil bacteria which decompose the organic additives. The improved soil structure enables larger quantities of air to be present and permits the maintenance of a more uniform supply of moisture in the soil, thereby providing a more suitable medium for the further culturing of soil bacteria. By this process the soil structure is improved by a cumulating process. Since clay and heavy loam soils may require many years to develop a satisfactory structure, it is desirable to provide a means of accelerating the formation of fertile soils. The development of good structure by intensive mechanical cultivation is not only short-lived but is frequently deleterious to the growing plants, due to the severance of the shallow feeder roots. If permanently improved structure could be obtained without the mechanical breaking of the surface layers, the rate of growth and the crop yields would be further improved.

When crops are grown on soils having poor physical structure there is usually inefficient utilization of the available plant nutrients. Furthermore, soils of poor structure are usually deficient in nutrients, and when fertilizers are added large portions are lost by the leaching action of rainfall before assimilation by the growing plants can take place. Thus, frequent fertilizer applications are required to effect adequate growth and a relatively small proportion of the added fertilizers are used by plants.

The primary purpose of this invention is to provide new compositions which condition the structure of the soil and provide nutrient values in an unusually available form. A further purpose of this invention is to increase the yields of agricultural products through improved germination, rapid and abundant growth and the optimum development of fruit or other useful products. A still further purpose of this invention is to provide surfaces unusually resistant to erosion prior to and during the growth of cover crops.

It has been found that certain water-soluble polymers induce the aggregation of soils and thereby promote improved agricultural characteristics in the soils. It has been found that plant nutrients in the presence of these polymers are more available and are efficiently utilized by the plants. The combination of the polymers and nutrients provides substantially greater benefits than either component when used separately.

The synergistic cooperation is unusual since the effect of the combination is substantially greater than the sum of the individual effects.

In accordance with this invention soil-benefiting compositions are prepared by mixing plant nutrients and polymeric water-soluble polyelectrolytes having weight average molecular weights of at least 10,000, and having a substantially linear continuous carbon chain derived by the polymerization of aliphatic unsaturated groups.

One type of compound useful in the practice of the invention is the equimolar copolymer of a polycarboxylic acid derivative and at least one other monomer copolymerizable therewith. The polycarboxylic acid derivative may be maleic anhydride, maleic acid, fumaric acid, itaconic acid, citraconic acid, aconitic acid, the amides of these acids, the alkali metal, alkaline earth metal, and ammonium salts of these acids, the partial alkyl esters, salts of the partial alkyl esters and the substituted amides of these polycarboxylic acids. The carboxylic acid, carboxylic acid salt, amide and substituted amide radicals are the ionizable groups which contribute to the hydrophilic properties and tend to make the polymers water-soluble. The hydrophilic properties may be entirely, or in part, due to the comonomer when acrylic acid, acrylamide, acrylic acid salts of alkali metals and ammonium, N-substituted acrylamide and the corresponding derivatives of methacrylic, crotonic or other polymerizable acids are used. Thus, a copolymer of a dialkyl maleate and acrylic acid will be a water-soluble polyelectroyte. When the hydrophilic maleic acid derivatives are used, hydrophobic comonomers may be used, for example ethylene, propylene, isobutylene, styrene, α-methylstyrene, vinyl acetate, vinyl chloride, vinyl formate, vinyl alkyl ethers, alkyl acrylates and alkyl methacrylates. In the practice of this invention the dibasic acid derivatives of the copolymers may be maleic acid, maleic anhydride, sodium maleate, potassium maleate, ammonium maleate, calcium maleate, monosodium maleate, monopotassium maleate, monoammonium maleate, monocalcium maleate, and a monoalkyl maleate, maleic acid amide, the partial amide of maleic acid, the N-alkyl substituted maleic acid amide, the N-aminoethyl maleamide, the N-aminoethyl maleimide, the alkylaminoalkyl maleamides, and the corresponding derivatives of itaconic, citraconic, fumaric and aconitic acids. Any of the said polybasic acid derivatives may be copolymerized with any of the other monomers described above, and any other which forms a copolymer with dibasic acid derivatives in equimolar proportions. The polybasic acid derivatives may be copolymers with a plurality of comonomers, in which case the total molar porportions of the comonomers will be equimolar with respect to the polybasic acid derivatives. Although these copolymers may be prepared by direct polymerization of the various monomers, frequently they are more easily prepared by an after reaction of other copolymers. For example copolymers of maleic anhydride and another monomer may be converted to maleic acid copolymers by reaction with water and to metal salt copolymers by reaction with alkali metal compounds, alkaline earth metal compounds or ammonium compounds.

Certain of the hydrophilic derivatives of unsaturated polycarboxylic acids may be polymerizable in less than equimolar proportions with certain of the less hydrophobic comonomers, for example vinyl formate and vinyl acetate, or with monomers with ionizable groups, such as acrylic acid, the alkali metal and ammonium salts of acrylic acid, acrylamides, and the various N-substituted acrylamides, methacrylic acid, the alkali metal and ammonium salts of methacrylic acid, methacrylamide and the various N-substituted methacrylamides, crotonic acids and the alkali metal and ammonium salts of crotonic acids, the crotonamides and the N-substituted crotonamides, vinyl sulfonic acid, vinyl phosphonic acid and vinyl pyrrolidone. The hydrophilic derivatives of polycarboxylic acids include the half alkyl esters of maleic acid, and the partial alkyl esters of fumaric, itaconic, citraconic and aconitic acids. When less than 50 mole per cent of these hydrophilic polybasic acid derivatives are used, and especially with the hydrophobic monomers, such as vinyl acetate and vinyl formate, the minimum proportion of polybasic acid derivative is that which will render the copolymer water-soluble.

Another modification of the coplymers of the various unsaturated polycarboxylic acid derivatives are those wherein more than 50 mole per cent of the polycarboxylic acid derivative is copolymerized therein. This type of which fumaric acid and itaconic acid are examples of the hydrophilic monomer may involve a wide variation with respect to the non-hydrophilic monomer, ethylene, propylene, isobutylene, styrene, α-methylstyrene, vinyl acetate, vinyl formate, vinyl alkyl ethers, alkyl acrylates, and alkyl methacrylates being useful. If desired, the comonomer may be one which contributes to the hydrophilic property, for example vinyl alcohols, acrylic acid, methacrylic acid, acrylamide, methacrylamide and the various amides which have alkyl, aminoalkyl, or alkylaminoalkyl substituents on the nitrogen atom. The proportions of these various comonomers contemplate the use of more than 50 mole per cent of the polybasic acid derivative and less than 50 mole per cent of the comonomer. The comonomer may be used in relatively small proportions, depending upon the hydrophilic or hydrophobic nature of the comonomer; sufficient total hydrophilic groups in both monomers must be present to render the resultant copolymer soluble in water under the conditions of use. This type of copolymer may involve a plurality of the polycarboxylic acid derivatives and/or a plurality of the comonomers.

Other suitable polyelectrolytic polymers are the polymers of acrylic or methacrylic acid derivatives, for example acrylic acid, the alkali metal and ammonium salts of acrylic acid, methacrylic acid, the alkali metal and ammonium salts of methacrylic acid, acrylamide, methacrylamide, the N-alkyl substituted amides, the N-aminoalkylamides, and the corresponding N-alkylaminoalkyl substituted amides, the aminoalkyl acrylates, the aminoalkyl methacrylamides and the N-alkyl substituted amino-alkyl esters of either acrylic or methacrylic acids. These polymeric compositions may be the homopolymers or they may be copolymers with other copolymerizing monomers such as ethylene, propylene, isobutylene, styrene, α-methylstyrene, vinyl acetate, vinyl formate, alkyl ethers, acrylonitrile, methacrylonitrile, vinyl chloride, vinylidene chloride, the alkyl acrylates, the alkyl methacrylates, the alkyl maleates, and the alkyl fumarates, and other olefinic monomers copolymerizable therewith. The copolymers of this type, having at least 50 mole per cent of the acrylic or methacrylic acid derivatives, are preferred, and especially when the comonomer is hydrophobic or has no ionizable groups. Polymers of this type may be prepared directly by the polymerization of suitable monomers, or by the after chemical reaction of other polymers, for example by the hydrolysis of acrylonitrile or methacrylonitrile polymers.

Other useful polymeric polyelectrolytes are the polymers which derive their hydrophilic characteristics from the presence of amine radicals. These include the polyvinylpyridines, the poly-N-vinyl amines, the poly-N-allylamines, the heterocyclic nitrogen compounds wherein the nitrogen is a tertiary amino group, and the amine and ammonium salts of said cyclic compounds. The vinyl amines may be present in copolymers with vinyl acetate, vinyl formate, vinyl chloride, acrylonitrile, styrene, esters of acrylic acid, esters of methacrylic acid, and other monomers capable of existing in copolymeric form with the N-vinyl amines. Included within the scope of this type of polymeric polyelectrolyte are the products derived by the hydrolysis of amides and imides, such as N-vinylformamide, N-vinylacetamide, N-vinylbenzamide, N-vinyl-N-methylformamide, N - vinyl - N - methacetamide, N-vinyl - N - methylbenzamide, N - vinylphthalimide, N - vinylsuccimide, N - vinyldiformamide, and N - vinyldiacetamide. Similarly, copolymers of these various amides with other polymerizable monomers may be first prepared and subsequently hydrolyzed to the corresponding vinyl amine derivatives. The polyallylamines and polymethallylamines and copolymers thereof may be prepared by copolymerizing acrylonitrile or methacrylonitrile, alone or in the presence of other monomers, and then by hydrogenation converted into amine-containing polymers.

Another important class of polymeric polyelectrolytes are the polymers of vinyl substituted amides, such as vinyl pyrrolidone, vinyl piperidone, the alkyl substituted products thereof, N-vinyl-N-methylformamide, N-vinylformamide, N-vinylacetamide, and other vinyl substituted amides, the polymers of which are water-soluble. Useful compounds include homopolymers and copolymers with vinyl acetate, acrylonitrile, isobutylene, ethylene, styrene, vinyl chloride, vinylidene chloride, vinyl formate, vinyl alkyl ethers, alkyl acrylates, alkyl methacrylates, and copolymers with the more hydrophilic monomers, such as acrylic acid, methacrylic acid, acrylamide, methacrylamide, the various substituted amides, monoalkyl esters of maleic acid, the aminoalkyl esters of acrylic acid or other polymerizable acids, the alkali metal and ammonium salts of acrylic or other polymerizable acids, and other polymerizable compounds with ionizable functions.

Another class of polymeric polyelectrolytes are the polymers of vinyl sulfonic acid, and the copolymers of vinyl sulfonic acid with one or more polymerizable organic monomers, for example vinyl chloride, acrylonitrile, styrene, vinyl acetate and other polymerizable mono-olefinic compounds. Although the polymers and copolymers of vinyl sulfonic acid may be prepared by direct polymerization, they are more easily prepared by indirect methods. For example, polymers and copolymers of vinyl sulfonyl chloride may be first prepared and then hydrolyzed for conversion into vinyl sulfonic acid polymers, the vinyl sulfonic acid salt polymers, the vinyl sulfonic acid amides, and other vinyl sulfonic acid derivatives capable of ionization in aqueous solutions. Another useful indirect method of preparing this class of polymeric polyelectrolytes involves the preparation of polymers of unsaturated hydrocarbons, for example ethylene, propylene, isobutylene, styrene, α-methylstyrene, and others, or the copolymers of the said unsaturated hydrocarbons and other polymerizable monoolefinic compounds such as vinyl chloride, acrylonitrile vinyl acetate, methyl methacrylates, alkyl acrylates and others, and thereafter introducing the sulfonic acid nuclei by a conventional sulfonation reaction. The sulfonic acid groups so introduced may be converted to sulfonic acid salts, acid amides or other electrolytic grouping. The copolymers of this type may involve the use of a plurality of sulfonic acid monomers and/or a plurality of the conventional comonomers as described.

As described above in connection with the various types of polyelectrolytic polymers suitable for the practice of this invention, the hydrophilic polymer may be prepared directly by the polymerization or copolymerization of one or more of the various available organic monomers with aliphatic unsaturation, if the said compounds contain a hydrophilic group, for example carboxyl groups. Generally, more types of polyelectrolytic polymers can be prepared by subsequent reactions of polymers and copolymers. For example, polymers containing nitrile groups may be hydrolyzed to form water-soluble amide and carboxy containing polymers or hydrogenated to form amine containing polymers. Similarly copolymers of maleic anhydride and vinyl acetate may be hydrolyzed to form polymers containing hydrophilic lactone rings. Other hydrophilic polymers may be prepared by the hydrolysis of copolymers of vinyl acetate wherein the acetyl groups are removed leaving hydroxy groups which promote the solubilizaton effect of polyelectrolytic groups present. By other reactions non-hydrophilic polymers may be converted into lactam or amide containing polymers which are more hydrophilic. Polyvinyl alcohol, not in itself a polyelectrolyte, may be converted into polyelectrolytes by esterification with dibasic acids, one of said carboxylic acid groups reacting with the alcohol radical and the other providing the hydrophilic characteristics by a carboxy group on the side chain. Still other types of polymers may be prepared by reacting halogen containing polymers, for example the polymers or copolymers of vinyl chloroacetate or vinyl chloroethyl ether, with amines to form amine salt radicals and quaternary ammonium radicals whereby hydrophilic characteristics are introduced into what otherwise would be an insoluble polymer. Other soluble polymers may be prepared by the ammonolysis of ketone containing polymers, for example polyvinyl methyl ketone. Similarly active halogen atoms may be reacted with bisulfite to substitute sulfonic acid group for the reactive halogens. Other types of polymers prepared by the subsequent reaction of previously prepared polymers have been explained above in connection with the sulfonic and sulfonic acid salts of polymeric hydrocarbons and in connection with the vinyl amine polymers by hydrolysis of the N-vinyl amides.

Thus, the various polyelectrolytes of the types described above are ethylenic polymers having numerous side chains distributed along a substantially linear continuous carbon atom molecule. The side chains may be hydrocarbon groups, carboxylic acid groups or derivatives thereof, sulfonic acid groups, or derivatives thereof, phosphoric acid or derivatives thereof, heterocyclic nitrogen groups, amino-alkyl groups, alkoxy radicals and other organic groups, the number of which groups and the relative proportions of hydrophilic and hydrophobic groups being such as to provide a water-soluble polymeric compound having a substantially large number of ionizable radicals. The length of the said continuous carbon chain must be such as to provide compounds having a weight average molecular weights of at least 10,000.

The expression "water-soluble polymers" as intended by its use in this specification and its appended claims includes those which form homogeneous mixtures with water, the difficultly soluble polymers which expand in the presence of water and dissolve to at least some extent, and even some which are apparently insoluble in distilled water but which tend to dissolve in soil water. This solubility enables the movement of the molecules within the soil mass through the medium of the soil moisture.

Although most of the polyelectrolytes described above are hydrophilic in nature and do not render the soil water-repellent, there are a few of the polymers, which, even though water-soluble, will make the soil water-repellent if used in excessive quantities. These polymers are those which have relatively high molecular weight dependent chains or which have a minimum number of ionizable groups. Although compositions of this kind are of marginal interest, they are entirely operative in producing improved structure, and when added in carefully controlled proportions, the objectionable water-repellent property of treated soils can be avoided.

The plant nutrients used in the practice of this invention may be organic fertilizers, including sewage sludge, processed sewage, urea, soybean meal, guano, dried blood, humus, animal manures, compost, bone meal, sawdust, peat moss, animal tankage, and other plant and animal waste products, or they may be inorganic, including limestone, ammonium salts, potassium salts, nitrates, phosphates and other compounds containing nitrogen, potassium, calcium and phosphorus, as well as the essential trace elements: boron, manganese, magnesium, cobalt, molybdenum, iron, etc.

The polymeric polyelectrolytes may have chemically reactive groups which combine with or adsorb the various acidic or basic fertilizer components, thereby minimizing losses due to rain leaching, and retaining nutrient elements for prolonged availability. This leads to more efficient utilization of nutrient values and to enhanced growth of plants.

The treated soils have interstices between the soil aggregates which provide channels for excess moisture drainage and for air access to plant roots. Within the aggregates is a substantial quantity of moisture, which, although stable to drainage and surface evaporation, is available to growing plants. The latter moisture may retain nutrients in dissolved state until extracted by plant roots. Nutrients in solid form may also exist within the aggregates, which particles, although soluble, are relatively stable to the washing effects of rainfall and dissolution in soil water. In this manner also, the polymer and nutrients coact to benefit the growing plants by retaining nutrient values for prolonged periods.

Since the usual organic fertilizers have only small nutrient content and primarily serve to improve structure, the function served more efficiently by the polyelectrolytic polymers, the non-nutrient portion of organic fertilizers is less essential. Accordingly, the preferred practice of this invention involves the use of mineral fertilizer of high nitrogen, phosphorus and potassium content, and which may have minor concentrations of other elements required for plant growth. Such fertilizers are mostly comprised of nutrient minerals, and may have from 15 to 50 per cent of their weight as elemental nitrogen, $P_2O_5$ and $K_2O$. It is conventional to describe mineral fertilizers in terms of the approximate percentage of each of the three most essential nutrients by a series of three numbers representing the approximate concentration of elemental nitrogen, $P_2O_5$ and $K_2O$, respectively. Useful soil treating compositions for general application are:

50 parts by weight of polyacrylamide and
50 parts of 4-12-4 inorganic mineral fertilizer.
30 parts by weight of sodium polyacrylate and
70 parts of 6-10-4 fertilizer (Vigoro).

When the metal ion of the polymer salt has fertilizing value or when the ammonium salt is used, the mineral fertilizers used in combination with the polymers need not have the usual high proportion of that element. If desired, one of the nutrient elements usually found in mixed fertilizer may be reduced in quantity or entirely omitted, when a substantial proportion of the polymer salt of that element is used. Accordingly, the following are general purpose formulations:

70 parts by weight of ammonium polyacrylate,
10 parts of potassium sulfate and
20 parts of Super Phosphate.
60 parts by weight of potassium polyacrylate and
40 parts of 6-12-2 inorganic fertilizer.
40 parts by weight of ammonium polymethacrylate and
60 parts of 2-14-4 inorganic fertilizer.

Although the use in combination with organic mineral fertilizer is preferred, uses with organic fertilizers are also feasible, this, the polymeric polyelectrolytes may be applied to soils in combination with "Milorganite," urea, sewage sludge, soybean meal, guano, bone meal, and other organic nutrients. Polymers may also be blended with both organic and inorganic nutrients.

In accordance with the practice of this invention soils, and particularly soils of poor structure, may be conditioned and fertilized by intimately dispersing the nutrient polymer in the soil, which may be done by adding the polymer and mixing by spading, cultivating, disking, harrowing, or other mixing methods commonly used in the agricultural arts. The polymers appear to react through the medium of soil water and unless the soil is parched there is sufficient moisture present for effective incorporation. Often it is advantageous to utilize additional moisture provided by rainfall or artificially through a spraying or irrigation procedure. When additional moisture is to be provided it is desirable for the polymeric compositions to be thoroughly mixed before wetting. After the nutrient polymer is dispersed in the soil, it is sometimes beneficial to work the soil thereby forming stable aggregates of the desired size. Polymeric compositions added to the surface of soil will ultimately become dispersed in the soil and the structure thereby improved, but such an expedient requires a longer period of time for effective improvement. In the latter case the polymers and nutrient substances diffuse into the soil through the soil moisture, aided by the normal cycles of wetting and drying and freezing and thawing and by cultivation.

An alternate method of the use of the polymer fertilizer composition involves the preparation of water solutions and the application to the soils in this form. This method of application is particularly useful in treating either fields in which plants, particularly those newly transplanted, are growing, or freshly seeded soils. By treating the areas immediately adjacent the growing plants, or the planted seeds, effective aggregation of the critical areas can be accomplished without expending the composition on the non-productive areas. It has been found that nutrient polymer solutions will effectively stabilize normally unstable aggregates merely by the addition of water solutions of the polymers to the cultivated soils and that no further mixing or separate aggregating step is necessary. The latter method preferably requires thorough cultivation of the soil to form relatively fine aggregates, thereby permitting complete penetration of the nutrient polymer solutions and the stabilization of the aggregates throughout the entire depth of the cultivated soil.

Further details of the invention are set forth with respect to the following specific examples:

EXAMPLE 1

Water-soluble polymers and solutions thereof were prepared by the following techniques:

1. *Polyacrylamide.*—Ten grams of acrylamide and 0.05 gram of potassium persulfate were dissolved in 90 ml. of water and heated in an oven at 60° C. for five hours. Because of some hydrolysis the polymer contained some ammonium salt and imide groups in addition to acrylamide units. The solution was diluted with 400 ml. of water for use in further tests.

2. *Dimethylaminoethyl polymethacrylate.*—Ten grams of dimethylaminoethyl methacrylate, and 3.86 grams of glacial acetic acid and 0.2 gram of potassium persulfate were dissolved in 90 ml. of water. This was placed in an oven at 70° C. overnight before dilution with 400 ml. of water.

3. *Sodium polyacrylate-vinyl alcohol copolymer.*—Ten grams of a finely ground copolymer of acrylonitrile (95%) and vinyl acetate (5%) having a specific viscosity of 0.28 (0.1% solution in dimethylformamide) was suspended in a solution of 0.1 gram of stearic acid and seven grams of sodium hydroxide in 400 ml. of water. The suspension was stirred and refluxed for ten hours during which time the polymer dissolved because of the hydrolysis of nitrile to amide and carboxylic acid sodium salt groups. The resultant solution was adjusted to a pH of eight by the addition of a small amount of hydrochloric acid and the solution diluted with water to 500 ml. total volume.

4. *Acrylamide-acrylonitrile copolymer.*—Ninety grams of acrylamide, ten grams of acrylonitrile, 0.2 gram of potassium persulfate and 0.1 gram of sodium bisulfite were dissolved in one liter of 50 per cent methyl alcohol and heated for four days at 60° C. The resultant precipitated polymer was then filtered, washed with methanol and dried. Two grams of this material was dissolved in 98 ml. of water for evaluation.

5. *Sodium polymethacrylate.*—Fifty grams of polymethacrylic acid having a specific viscosity of 1.25 (0.4% solution in dimethylformamide) and 17.5 grams of sodium hydroxide were dissolved in a liter of water.

6. *Ammonium polymethacrylate.*—Two grams of the polymethacrylic acid described above were dissolved in a mixture of 96 ml. of water and two ml. of concentrated ammonium hydroxide.

7. *Ammonium polyacrylate.*—Two grams of polyacrylic acid having a specific viscosity of 8.3 (0.4% solution in water) was dissolved in 98 ml. of water containing 2.8 ml. of concentrated aqueous ammonia.

8. *Sodium polyacrylate.*—Twenty grams of the above polyacrylic acid was dissolved in 980 ml. of water containing eleven grams of sodium hydroxide.

9. *Methacrylic acid (35%)-dimethylaminoethyl methacrylate (65)-copolymers.*—Six and one-half grams of dimethylaminoethyl methacrylate and 3.5 grams of methacrylic acid were dissolved in 90 ml. of water and 0.02 gram of potassium persulfate was added as a catalyst. The solution was heated at 60° C. overnight and then diluted to a two per cent solution for use.

10. *Acrylamide (50%)-ammonium polyacrylate (50%).*—Two grams of copolymer of acrylamide (50%)-acrylic acid (50%), having a specific viscosity (0.4% in water) of 0.46 was dissolved in 98 ml. of water containing 0.9 ml. of concentrated ammonia.

11. *Acrylamide (50%)-ammonium polymethacrylate (50%).*—Two grams of a copolymer of acrylamide (50%)-methacrylic acid (50%), having a specific viscosity (0.4% in water at pH 5.66) of 2.3, was dissolved in 98 ml. of water containing one ml. of concentrated ammonia.

12. *Alkali hydrolyzed copolymer of acrylonitrile (50)-methacrylic acid (50%).*—A two-gram sample of a copolymer of 50 per cent acrylonitrile and 50 per cent methacrylic acid was hydrolyzed with sufficient 6 Normal sodium hydroxide to neutralize the methacrylic acid and hydrolyze one-third of the acrylonitrile. After two hours unreacted alkali was neutralized with acetic acid and the solution diluted to 100 ml.

13. *Alkali hydrolyzed copolymer of acrylonitrile (50%)-methacrylic acid (50%).*—The preparation for Polymer No. 12 was repeated except with sufficient sodium hydroxide to hydrolyze two-thirds of the acrylonitrile and the reaction was conducted for seven hours.

14. *Alkali hydrolyzed copolymer of acrylonitrile (50%)-methacrylic acid (50%).*—The preparation for Polymer No. 12 was repeated except that 100 per cent of stoichiometric requirements of caustic soda were used with a reaction time of 13.5 hours.

15. *Acid hydrolysis of methacrylic acid (50%)-acrylonitrile (50%) copolymers.*—Two grams of a copolymer of methacrylic acid (50%) and acrylonitrile (50%) was added to a solution of 15 ml. of water and 50 ml. of concentrated sulfuric acid. After several days the thick solution was diluted with water and heated to separate a polyacid which still contained 44 per cent of the original nitrogen. Two grams of dried polymer was dissolved in 100 ml. of solution containing one ml. of 28 per cent ammonia solution.

16. *Acid hydrolysis of acrylonitrile (95%)-vinyl acetate (5%) copolymers.*—The acid hydrolysis used in the preparation of Polymer No. 15 was repeated on a copolymer of 95% acrylonitrile and 5% of vinyl acetate.

17. *Acid hydrolysis of acrylonitrile (98%)-vinyl acetate (2%) copolymer.*—The acid hydrolysis used in the preparation of Polymer No. 15 was repeated on a copolymer of 98% acrylonitrile and two per cent of vinyl acetate.

18. *Acid hydrolysis of acrylonitrile (80%)-methacrylonitrile (20%) copolymers.*—The acid hydrolysis used in the preparation of Polymer No. 15 was repeated on a copolymer of 80 per cent of acrylonitrile and 20 per cent of methacrylonitrile.

19. *Acid hydrolysis of acrylonitrile (84%)-methacrylonitrile (11%)-vinyl acetate (5%) copolymers.*—The acid hydrolysis used in the preparation of Polymer No. 15 was repeated on a copolymer of 84 per cent acrylonitrile, 11 per cent methacrylonitrile and five per cent of vinyl acetate.

20. *Acid hydrolysis of acrylonitrile (70%)-methacrylic acid (30%) copolymers.*—The acid hydrolysis used in the preparation of Polymer No. 15 was repeated on a copolymer of 70 per cent acrylonitrile and 30 per cent of methacrylic acid.

21. *Acid hydrolysis of polyacrylonitrile.*—The acid hydrolysis used in the preparation of Polymer No. 15 was repeated on polyacrylonitrile.

22. *Vinyl acetate-monosodium maleate.*—Two grams of a copolymer of vinyl acetate-maleic anhydride having a specific viscosity of 2.1 (one per cent in cyclohexanone) was dissolved in 100 ml. of solution containing 0.43 gram of sodium hydroxide.

23. *Vinyl acetate-diammonium maleate.*—Two grams of a copolymer of vinyl acetate-maleic anhydride having a specific viscosity of 2.1 (one per cent in cyclohexanone) was dissolved in 100 ml. of solution containing 1.45 ml. of 28 per cent ammonia solution.

24. *Vinyl acetate-maleic acid, triethanolamine salt.*—Two grams of a copolymer of vinyl acetate-maleic anhydride having a specific viscosity of 2.1 (one per cent in cyclohexanone) was dissolved in 100 ml. of solution containing 1.6 grams of triethanolamine.

25. *Vinyl acetate-maleic acid, β-dimethylaminoethyl half-ester.*—Vinyl acetate-maleic anhydride copolymer having a specific viscosity of 2.1 (one per cent in cyclohexanone) was warmed with an excess of β-dimethylaminoethanol. The half-ester was obtained as a rubbery product which when freed of β-dimethylaminoethanol was a granular solid. Two grams of this product was dissolved in 100 ml. of water.

26. *Vinyl acetate - ammonium maleamate.*—Vinyl acetate-maleic anhydride copolymer of specific viscosity 2.1 (one per cent in cyclohexanone) was dissolved in anhydrous dioxane. Anhydrous ammonia gas was passed into the solution and a precipitate separated. The dioxane was decanted and the precipitate washed with absolute ether. Two grams of this polymer was dissolved in 100 ml. of water.

27. *Vinyl acetate-N butylmaleamic acid, butylamine salt.*—Two grams of a vinyl acetate-N-butylmaleamic acid, butylamine salt, similarly prepared from vinyl acetate-maleic anhydride copolymer was dissolved in 100 ml. of water.

28. *Vinyl alcohol-sodium maleate.*—A vinyl formate-maleic anhydride copolymer was dissolved in hot water to give a five per cent solution and a trace of hydrochloric acid added. The lactone of the vinyl alcohol-maleic acid copolymer separated a rubbery material. The lactone was dissolved in sodium hydroxide solution to give a two per cent solution of vinyl alcohol-sodium maleate.

29. *Vinyl methyl ether - diammonium maleate.*—Two grams of a copolymer of vinyl methyl ether-maleic anhydride of specific viscosity 11.8 (one per cent in cyclohexanone) was dissolved in 100 ml. of solution containing 1.7 ml. of concentrated ammonia solution.

30. *Vinyl ethyl ether-diammonium maleate.*—Two grams of a copolymer of vinyl ethyl ether-maleic anhydride of specific viscosity 2.1 (one per cent in cyclohexanone) was dissolved in 100 ml. of a solution containing 1.5 ml. of concentrated ammonia solution.

31. *Isobutylene - diammonium maleate.*—Two grams of a copolymer of isobutylene-maleic anhydride of specific viscosity of 0.83 (0.2 per cent in dimethylformamide) was dissolved in 100 ml. of a solution containing 1.7 ml. of concentrated ammonia solution.

32. *Styrene-diammonium maleate.*—Two grams of styrene-maleic anhydride copolymer was dissolved in 100 ml. of a solution containing 1.3 ml. of concentrated ammonia solution.

33. *Styrene-maleic acid, β-dimethylaminoethyl half-ester.*—Styrene-maleic anhydride copolymer was warmed with an excess of β-dimethylaminoethanol. A spongy mass formed from which excess alcohol was removed by squeezing and by washing with absolute ether. Two grams of air-dried polymer was dissolved in 100 ml. of water.

34. *Ethyl acrylate - diammonium maleate.*—Two grams of a copolymer of ethyl acrylate-maleic anhydride was dissolved in 100 ml. of solution containing 1.3 ml. of concentrated ammonia solution.

35. *Vinyl acetate-maleic acid - ½ calcium salt.*—Two grams of a copolymer of maleic anhydride and vinyl acetate and 0.4 gram of calcium hydroxide were added to 100 ml. of water and agitated until solution was complete.

36. *Vinyl acetate - diammonium - maleate.*—Two grams of a copolymer of vinyl acetate-maleic anhydride having a specific viscosity of 3.1 (one per cent in cyclohexanone) was dissolved in 100 ml. of solution containing 1.45 ml. of 28 per cent ammonia solution.

37. *Vinyl acetate-diammonium maleate.*—Two grams of a copolymer of vinyl acetate-maleic anhydride having a specific viscosity of 4.75 (one per cent in cyclohexanone) was dissolved in 100 ml. of solution containing 1.45 ml. of 28 per cent ammonia solution.

38. *Vinyl methyl ether-diammonium maleate.*—Two grams of a copolymer of vinyl methyl ether-maleic anhydride of specific viscosity 13.8 (one per cent in cyclohexanone) was dissolved in 100 ml. of solution containing 1.7 ml. of 28 per cent ammonia solution.

39. *Vinyl ethyl ether-diammonium maleate.*—Two grams of a copolymer of vinyl ethyl ether-maleic anhydride of specific viscosity 17.5 (one per cent in cyclohexanone) was dissolved in 100 ml. of solution containing 1.55 ml. of 28 per cent ammonia solution.

40. *Isopropenyl acetate - diammonium maleate.*—Two grams of a copolymer of isopropenyl acetate-maleic anhydride having a specific viscosity of 19.3 (one per cent in cyclohexanone) was dissolved in 100 ml. of solution containing 1.35 ml. of 28 per cent ammonia solution.

41. *Vinyl isopropyl ether-diammonium maleate.*—Two grams of a copolymer of vinyl isopropyl ether-maleic anhydride having a specific viscosity of 1.98 (one per cent in cyclohexanone) was dissolved in 100 ml. of solution containing 1.45 ml. of 28 per cent ammonia solution.

42. *Vinyl n-butyl ether-diammonium maleate.*—Two grams of a copolymer of vinyl n-butyl ether-maleic anhydride having a specific viscosity of 3.07 (one per cent cyclohexanone) was dissolved in 100 ml. of solution containing 1.4 ml. of 28 per cent ammonia solution.

43. *Vinyl chloride-diammonium maleate.*—Two grams of a copolymer of vinyl chloride-maleic anhydride having a specific viscosity of 0.95 (one per cent in cyclohexanone) was dissolved in 100 ml. of solution containing 1.6 ml. of 28 per cent ammonia solution.

44. *Vinyl chloroacetate - diammonium maleate.*—Two grams of a copolymer of vinyl chloroacetate-maleic anhydride having a specific viscosity of 16.2 (one per cent in cyclohexanone) was dissolved in 100 ml. of a solution containing 1.3 ml. of 28 per cent ammonia solution.

45. *Vinyl acetate-maleic acid, partial methyl ester, ammonium salt.*—Two grams of a terpolymer of vinyl acetate (one mole), monomethyl maleate (0.08 mole) and maleic anhydride (0.92 mole) having a specific viscosity of 10.3 (one per cent in cyclohexanone) was dissolved in 100 ml. of solution containing 1.25 mole of 28 per cent ammonia solution.

46. *Vinyl methyl ether-maleic acid, half-calcium salt.*—Two grams of a copolymer of vinyl methyl ether-maleic anhydride having a specific viscosity of 11.8 (one per cent in cyclohexanone) 0.3 ml. of water and 0.4 gram of calcium hydroxide were blended together intimately. The product was water-soluble and contained 74 per cent polymer.

47. *Sodium salt of ethylated hydrolyzed polyacrylonitrile.*—Polyacrylonitrile was hydrolyzed in a mixture of water and ethanol using approximately the stoichiometric proportion of water and sufficient alcohol to keep the polymer in fluid suspension. After heating about eight hours at the reflux temperature the finely divided hydrolyzed product was recovered in a dense anhydrous form. It was essentially an ethylated sodium polyacrylate with some residual nitrogen.

48. *Potassium salt of ethylated hydrolyzed polyacrylonitrile.*—The procedure for preparing Polymer No. 47 was used to prepare the corresponding potassium salt of the ethylated hydrolyzed polyacrylonitrile.

49. *Sodium salt of isopropylated hydrolyzed polyacrylonitrile.*—The procedure of Polymer No. 47 was repeated using isopropanol as the reaction medium. The sodium salt of an isopropyl substituted hydrolyzed polyacrylic acid containing residual nitrogen was recovered by direct filtration of the reaction medium.

50. *Partial ester of maleic anhydride-vinyl acetate copolymer.*—Maleic anhydride was esterified with 0.45 mole of methyl alcohol and then copolymerized with an equimolar proportion of vinyl acetate.

51. *Partial calcium salt of the partial ester of maleic anhydride-vinyl acetate copolymer.*—The composition of Polymer No. 50 was mixed with 30 mole per cent of hydrated lime and ball-milled.

52. *Polyvinyl 2-chloroethyl ether.*—Vinyl 2-chloroethyl ether was polymerized in liquid propane containing crushed dry-ice using boron trifluoride catalyst. The polymer was isolated and purified by precipitation and dried (specific viscosity of one per cent benzene solution equals 1.00). The polymer was dissolved in dimethylformamide and trimethylamine added and the solution heated. The resulting water-soluble polymer, containing quaternary ammonium salt groups as part of the polymer molecule, was isolated by precipitation in ether.

53. *Vinyl 2-chloroethyl ether-maleic anhydride copolymer.*—A copolymer of vinyl 2-chloroethyl ether and maleic anhydride was prepared by copolymerizing equal molecular proportions of the two monomers using a peroxide catalyst. The resulting polymer was converted to the sodium salt for tests in soil.

54. *Vinyl acetate and methacrylic acid copolymer.*—A copolymer of vinyl acetate and methacrylic acid was prepared by suspension polymerization. Analysis showed the copolymer contained methacrylic acid units amounting to 38 per cent by weight. This polymer was converted to the water-soluble ammonium salt for testing in soil.

55. *Acrylonitrile - methacrylic acid copolymer.*—A polymer obtained by copolymerization of acrylonitrile and methacrylic acid was shown by analysis to contain 64 per cent by weight of methacrylic acid residues. The ammonium salt of this polymer was used for soil tests.

56. *Styrene - methacrylic acid copolymer.*—A copolymer of styrene and methacrylic acid was prepared using a peroxide catalyst. Filtration of the polymer gave a neutralization equivalent corresponding to 76 per cent by weight methacrylic acid. The polymer was converted to the ammonium salt and tested for soil aggregate stabilizing effect.

57. *Polyvinyl hydrogen phthalate.*—Polyvinyl hydrogen phthalate was dissolved in dilute aqueous ammonia to yield a solution of the ammonium salt of this polymer. This solution was used for tests with soil.

58. *Polyvinyl pyrrolidone.*—Polyvinyl pyrrolidone was prepared by polymerizing N-vinyl pyrrolidone in aqueous solution. The polymer formed was fractionated by partial precipitation of a methanol solution with ether. The higher molecular weight fraction was tested with soil.

59. *Styrene-itaconic anhydride copolymer.*—A styrene and itaconic anhydride copolymer was prepared in ethylene dichloride using 2,4-dichlorobenzoyl peroxide catalyst. This was converted to the ammonium salt by dissolving in dilute aqueous ammonia. This solution was used for aggregation tests on soil.

60. *Sulfonated polystyrene.*—Polystyrene of about 65,000 molecular weight was sulfonated in ethylene dichloride solution using as the sulfonating agent a 2:1 complex of bis-$\beta$-chloroethyl ether and sulfur trioxide. After isolation the sulfonated polystyrene gave a neutral equivalent of 220, corresponding to an average of 0.75 sulfonic groups per phenyl group. This polymer was converted to the sodium salt for use in soils.

61. *Polyvinyl piperidone.*—Piperidone was vinylated with acetylene to yield N-vinyl piperidone. This was polymerized to yield a water-soluble polymer.

62. *Vinyl acetate-monomethyl maleate copolymer.*—Vinyl acetate was copolymerized with monomethyl maleate in an emulsion system to yield a polymer which analysis showed contained 7.5 per cent by weight monomethyl maleate groups. This polymer was soluble in dilute alkali and was used in the form of its sodium salt.

63. *Vinyl acetate-itaconic anhydride copolymer.*—Vinyl acetate and itaconic anhydride were copolymerized in a "solvent-non-solvent" type polymerization using ethylene dichloride solvent. The vinyl acetate and itaconic anhydride were charged in a weight ratio of 0.77:1. The resulting polymer was shown by analysis to contain about 37 per cent by weight vinyl acetate units. The polymer was used in soils in the form of its ammonium salt.

Any of the above described polymeric polyelectrolytes and other water-soluble polyelectrolytes of the class defined may be mixed with plant nutrients of finely divided state, and especially the inorganic fertilizers, in the practice of this invention.

EXAMPLE 2

The effect of the polymers on the percentage of water stable aggregates was determined by the following procedure. To 100 grams of Miami silt loam pulverized to pass a 0.25 mm. sieve, was added 30 ml. of distilled water containing the appropriate amount of the polymer. The soil was well-mixed and pressed through a 4-mm. sieve. After drying for at least two days in a warm room at low humidity, air at 50° C. was blown on the soil for ten minutes to complete the drying. Forty-gram samples were placed on the top sieve of a set of three sieves, 0.84 mm., 0.42 mm. and 0.25 mm. arranged in order of decreasing size. The sieves were raised and lowered in water through a distance of 1.5 inches at the rate of thirty cycles per minute for thirty minutes. At the end of that time the sieves were raised, allowed to drain, the soil dried at 80° C. and weighed. The results are reported in Table I, as the per cent of water stable aggregates larger than 0.25 mm. Miami silt loam without the addition of polymer gave almost no water stable aggregates.

TABLE I

*Percent of water-stable aggregates >0.25 mm. in Miami silt loam after treatment with polymers*

| Polymer number | Percent polymer on soil | | | | |
|---|---|---|---|---|---|
| | 0.005 | 0.01 | 0.02 | 0.05 | 0.1 |
| None | | | | | |
| 1 | | 11.7 | | | 70.8 |
| 2 | | | | | 53.0 |
| 3 | | | 39.3 | | 97.3 |
| 6 | | 4.5 | | | 70.7 |
| 9 | | | 3.0 | | 23.0 |
| 10 | | 3.5 | | | 80.8 |
| 12 | | 19.8 | | | 95.3 |
| 13 | | 9.5 | | | 93.5 |
| 14 | | 8.5 | | | 91.3 |
| 15 | | 29.8 | | | 93.8 |
| 16 | | 15.5 | | | 97.0 |
| 17 | | 18.3 | | | 92.5 |
| 18 | | 4.3 | | | 62.0 |
| 19 | | 25.5 | | | 82.3 |
| 20 | | 6.5 | | | 73.3 |
| 21 | | 11.8 | | | 92.0 |
| 23 | 3.0 | 7.8 | 45.0 | 90.7 | 95.5 |
| 24 | | 7.3 | | | 93.8 |
| 25 | | 2.8 | | | 79.3 |
| 26 | | 4.0 | | | 90.5 |
| 27 | | 1.5 | | | 89.8 |
| 28 | | .8 | | | 41.2 |
| 29 | 5.6 | 38.5 | | | 95.1 |
| 30 | | 15.8 | | | 93.8 |
| 31 | | 13.3 | | | 91.8 |
| 32 | | 8.7 | | | 96.2 |
| 33 | | 3.7 | | | 78.0 |
| 34 | | 1.0 | | | 95.7 |
| 35 | | 26.5 | | | 93.7 |
| 36 | | 24.8 | | | 94.0 |
| 37 | | 31.8 | | | 98.0 |
| 38 | | 44.8 | | | 90.8 |
| 39 | | 42.8 | | | 97.3 |
| 40 | | 40.8 | | | 99.8 |
| 41 | | 3.3 | | | 96.8 |
| 42 | | 19.8 | | | 97.0 |
| 43 | | 3.8 | | | 63.3 |
| 44 | | 13.8 | | | 94.5 |
| 45 | | 30.3 | | | 95.0 |
| 46 | | 5.3 | | | 96.6 |
| 47 | | | | 47 | 97 |
| 48 | | | | 66.5 | |
| 49 | | | 41.0 | 52 | |
| 50 | | | 27 | | 96 |
| 51 | | | 67 | | 92.5 |
| 52 | | | | | 43 |
| 53 | | | | | 91 |
| 54 | | | | | 44 |
| 55 | | | | | 75 |
| 56 | | | | | 81 |
| 57 | | | | | 75 |
| 58 | | | | | 58 |
| 59 | | | | | 88 |
| 60 | | | | | 62 |
| 61 | | | | | 33 |
| 62 | | | | | 60 |
| 63 | | | | | 75.5 |

The crumb stabilities of Miami silt loam soils when treated with other polymeric compositions, not included within the scope of this invention, were tested by the identical procedure. The following Table No. II sets forth the observed values.

TABLE II

*Percent of water-stable aggregates >0.25 mm. in Miami silt loam after treatment with polymers*

| Polymer | Percent polymer on soil | | | | |
|---|---|---|---|---|---|
| | 0.005 | 0.01 | 0.02 | 0.05 | 0.1 |
| "Carbowax 6000" [1] | | 0.3 | | | 0.3 |
| Polyvinyl methyl ether | | .3 | | | .3 |
| "Urea-form" | | .3 | | | .4 |
| "Methocel 50" | | .5 | | | 15.5 |
| "Methocel 1500" [2] | | .5 | | | 13.3 |
| Sodium alginate | | .5 | | | 41.3 |

[1] Polyethylene oxide.
[2] Cellulose methyl ether.

The above aggregate stabilities were measured on soils treated with polymeric polyelectrolytes without separate nutrients because of the fact that added electrolyte often increases the aggregate stability. Thus, the combination of most fertilizers with polymeric polyelectrolytes may produce enhancing structural improvement, which effect varies with both the quantity and nature of the ionizable substances introduced by the nutrient component. A comparison of the beneficial effects of the various polyelectrolytes in the above tables requires examination of the aggregate stability of soils treated with polymers but without nutrients. The following experiments demonstrate the cooperative effects of polyelectrolytes and plant nutrients and the synergistic effects of mixtures of both.

EXAMPLE 3

Radishes were planted in flats containing Miami silt loam treated with various organic manures and composts at one per cent and polymers at 0.05 per cent. Table III shows the effect of polymers alone and the cooperative effect with inorganic fertilizer compared with organic manures and composts which contain many times as much nutrients.

TABLE III

*Comparison of polymers and polymers plus nutrients with one per cent organic manures and composts in Miami silt loam for the growth of radishes*

| Treatment | Percent Germination | Average size improvement factor [1] | Yield improvement factor [1] |
|---|---|---|---|
| Control No. 1 | 83 | 0.93 | 0.84 |
| Control No. 2 | 90 | 1.07 | 1.16 |
| 1% dried cow manure | 61 | 2.3 | 1.6 |
| 1% "milorganite" [a] | 49 | .64 | .34 |
| 1% Frazer compost [b] | 88 | 1.0 | 1.0 |
| 1% peat | 83 | 1.1 | 1.0 |
| 1% cocoa waste compost | 83 | 1.1 | 1.1 |
| 0.05% polymer No. 17 | 85 | 1.7 | 1.7 |
| 0.05% polymer No. 17+0.05% 6-10-4 fertilizer | 78 | 3.4 | 3.0 |
| 0.05% polymer No. 5 | 90 | 1.2 | 1.2 |
| 0.05% polymer No. 5+0.05% 6-10-4 fertilizer | 85 | 2.1 | 2.0 |
| 0.05% polymer No. 22 | 88 | 1.7 | 1.7 |
| 0.05% polymer No. 22+0.05% 6-10-4 fertilizer | 82 | 1.9 | 1.8 |
| 0.05% polymer No. 46 | 83 | 1.7 | 1.6 |
| 0.05% polymer No. 46+0.05% 6-10-4 fertilizer | 99 | 2.6 | 2.6 |

[a] Sewage sludge produced by the city of Milwaukee, Wisconsin.
[b] Produced from garbage wastes by Frazer Products, Inc.
[1] All treatments compared to average of controls.

EXAMPLE 4

Radishes were planted in flats treated with each of the fertilizers: 4-12-4 mineral peat moss and "Urea-Form," both with and without Polymer No. 22. After fifty days' growth the radishes were harvested and weighed. The following table shows the unusual cooperative effect of the polymer and conventional fertilizers:

TABLE IV

*Growth of radishes in soil containing polymer and nutrient fertilizers*

| Treatment | Total yield (g.) | Yield improvement factor | Average weight /radish (g.) | Weight improvement factor |
|---|---|---|---|---|
| 0.02% 4-12-4 fertilizer [1] | 19 | | 0.35 | |
| 0.02% 4-12-4 fertilizer + 0.02% polymer No. 22 | 69 | 3.6 | 1.18 | 3.0 |
| 1% peat moss | 31 | | .53 | |
| 1% peat moss + 0.02% polymer No. 22 | 75 | 2.4 | 1.29 | 2.4 |
| 0.01% "urea-form" [2] | 46 | | .84 | |
| 0.01% "urea-form" + 0.02% polymer No. 22 | 118 | 2.6 | 1.90 | 2.3 |

[1] This corresponds to an application of 500 lbs. per acre.
[2] Contains 37 percent N.

EXAMPLE 5

In a large field test plot corn was grown in Pauling clay soil. Part of the plot was treated with 2000 pounds per acre of the one-half calcium salt of a copolymer of maleic acid and vinyl acetate. Part of the said treated area and part of the untreated area were fertilized with 550 pounds per acre of a 20.5 per cent nitrogen fertilizer. The following table sets forth the corn yields in all of the plots:

| Treatment | Bushels per acre |
|---|---|
| Control | 44.71 |
| Polymer alone | 48.21 |
| Yield increase due to polymer | 3.5 |
| Fertilizer alone | 63.88 |
| Fertilizer + Polymer | 76.12 |
| Yield increase due to polymer | 12.24 |

It will be noticed that yield increases are much greater in fertilized soil indicating that the polymers induce a more efficient utilization of the fertilizer.

Since fertilizers are usually required periodically to maintain a continued optimum fertility, the application of the polymers in combination with the fertilizers enables less frequent application or smaller applications to maintain uniform level of crop production. The proportions of the polymers and fertilizers in the combined additive depend to a great extent on the requirements of the anticipated crop, and the nutrient content and structure of the soil before treatment. In general, a previously untreated soil may require an additive having nutrients and polymer in quantities of the same order. For example, useful general purpose compositions may have from ten to 90 per cent of nutrient minerals and ten to 90 per cent of the polymer. Compositions of both higher and lower proportions of either component may have special purpose uses. For example, a soil having previously been treated may only need a composition having from one to ten per cent of the polymer and from 90 to 99 per cent of nutrient, the small percentage of polymer being needed to replace the small quantities lost by leaching, by destructive action of soil bacteria or for other similar reasons. Compositions with less than ten per cent nutrients may have special application in soil of extremely poor structure which has not been used, or has only been occasionally used, over a period of years, and which may have a relatively high nutrient content.

The valuable new soil conditioning fertilizers may be used alone or with any of a variety of carriers or additives, which may be functional or merely diluents. Thus, the new compositions may be used in the form of aqueous solutions or as solid mixtures of polymers and plant nutrients with or without other solid soil benefiting compounds. A preferred and very effective composition is prepared by grinding a mixed composition to a finely sub-divided state, or by blending a plant nutrient and a polymeric polyelectrolyte each of which has been separately ground to a fine state of sub-division. The finely divided compositions are more effective and efficient in accomplishing the intended purpose of the invention. Being more intimately mixed the reaction between the component parts and between each component and the soils takes place more quickly and completely. The latter is especially true if the soil is moist. The fine state of sub-division also aids in permitting uniform spreading and mixing of the composition in the soil.

This application is a continuation-in-part of applications, Serial Nos. 148,521 and 148,522, filed March 8, 1950, by the same inventors and now abandoned.

What we claim is:

1. A soil conditioning fertilizer which comprises a mixture of a finely divided flowable solid plant nutrient and a finely divided solid synthetic polymeric water-soluble polyelectrolyte having a weight average molecular weight of at least 10,000, and a structure derived by the substantially linear polymerization of at least one mono-olefinic compound through the aliphatic unsaturated group.

2. The product defined by claim 1, wherein the polymer is a calcium salt of a hydrolyzed polymer of acrylonitrile.

3. The product defined by claim 1, wherein the polymer is a sodium salt of a hydrolyzed polymer of acrylonitrile.

4. The product defined by claim 1, wherein the polymer is a copolymer having the structure of a copolymer of vinyl acetate and the reaction product formed by partially esterifying maleic anhydride with methyl alcohol.

5. The product defined by claim 1, wherein the polymer is a copolymer having the structure of an ammonium salt of a copolymer of isobutylene and maleic acid.

6. A soil conditioning fertilizer which comprises a mixture of a finely divided flowable solid plant nutrient and a finely divided solid synthetic polymeric compound selected from the group consisting of polymers of acrylic acid, salts of polymers of acrylic acid, salts of hydrolyzed polymers of acrylonitrile, hydrolyzed polymers of acrylonitrile, polymers of methacrylic acid, salts of polymers of methacrylic acid, salts of hydrolyzed polymers of methacrylonitrile, hydrolyzed polymers of methacrylonitrile, salts of copolymers of unsaturated polycarboxylic acids and at least one other mono-olefinic monomer, copolymers of unsaturated polycarboxylic acids and at least one other mono-olefinic monomer, salts of hydrolyzed copolymers of unsaturated polycarboxylic acid anhydrides and at least one other mono-olefinic monomer, hydrolyzed copolymers of unsaturated polycarboxylic acid anhydrides and at least one other mono-olefinic monomer, salts of copolymers of the partial alkyl esters of unsaturated polycarboxylic acids and at least one other monoolefinic monomer, copolymers of unsaturated dicarboxylic acid anhydrides and at least one other mono-olefinic monomer, copolymers of the partial alkyl esters of unsaturated polycarboxylic acids and at least one other mono-olefinic monomer, salts of sulfonated polymers of hydrocarbons containing aliphatic unsaturation, sulfonated polymers of hydrocarbons containing aliphatic unsaturation, polymers of amines containing aliphatic unsaturation, and polymers of amides containing aliphatic unsaturation, said polymeric compound being derived substantially entirely by olefinic polymerization.

7. A soil conditioning fertilizer which comprises a mixture of a finely divided flowable solid plant nutrient, and a finely divided solid synthetic water-soluble polymer having a weight average molecular weight of at least 10,000, and being an olefinic copolymer of a compound containing the molecular grouping

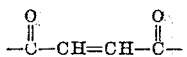

and at least one other mono-olefinic monomer.

8. A soil conditioning fertilizer which comprises a mixture of a finely divided flowable solid plant nutrient, and a finely divided solid synthetic water-soluble polymer having a weight average molecular weight of at least 10,000, and being a polymer of a compound containing the molecular grouping

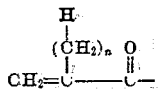

wherein $n$ is an integer from zero (0) to one (1), inclusive, said polymer being substantially free of cross-linking.

9. A soil conditioning fertilizer which comprises a mixture of a finely divided flowable solid plant nutrient and a finely divided solid synthetic water-soluble polymer having a weight average molecular weight of at least 10,000, and being derived substantially entirely by olefinic copolymerization of a mono-olefinic dicarboxylic acid anhydride and at least one other mono-olefinic monomer.

10. The product defined by claim 9, wherein the copolymer is a copolymer of vinyl acetate and maleic anhydride.

11. A soil conditioning fertilizer which comprises a mixture of a finely divided flowable solid plant nutrient and a finely divided solid synthetic polymeric water-soluble polyelectrolyte having a molecular weight such as to improve the water-stability of aggregates in said soil, said polyelectrolyte being derived substantially entirely by olefinic polymerization.

12. A soil conditioning fertilizer which comprises a mixture of a finely divided flowable solid plant nutrient and a finely divided solid synthetic polymeric water-soluble substantially linear polyelectrolyte having a molecular weight such as to improve the water-stability of aggregates in said soil, said polyelectrolyte being a copolymer of a compound containing the molecular grouping

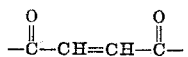

and at least one other mono-olefinic monomer.

13. A soil conditioning fertilizer which comprises a mixture of a finely divided flowable solid plant nutrient and a finely divided solid synthetic polymeric water-soluble substantially linear polyelectrolyte having a molecular weight such as to improve the water-stability of aggregates in said soil, said polyelectrolyte being a polymer of a compound containing the molecular grouping

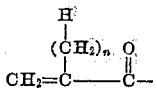

wherein $n$ is an integer from zero (0) to one (1), inclusive.

DAVID T. MOWRY.
ROSS M. HEDRICK.

REFERENCES CITED

The following references are of record in the file of this patent:

UNITED STATES PATENTS

| Number | Name | Date |
| --- | --- | --- |
| 2,582,194 | Dudley | Jan. 8, 1952 |